United States Patent [19]

Chatterjee

[11] Patent Number: 5,300,539
[45] Date of Patent: Apr. 5, 1994

[54] POST-POLYMERIZATION ADDITIVE INCORPORATION PROCESS

[75] Inventor: Ananda M. Chatterjee, Katy, Tex.

[73] Assignee: Shell Oil Company, Houston, Tex.

[21] Appl. No.: 996,944

[22] Filed: Dec. 28, 1992

[51] Int. Cl.⁵ .................. C08K 7/06; B05D 7/02; B05D 1/02; B32B 5/16

[52] U.S. Cl. .................. 523/204; 523/205; 523/207; 428/407; 427/222; 427/424; 427/425

[58] Field of Search ............ 523/204, 205, 207; 428/407; 427/222, 424, 425

[56] References Cited

U.S. PATENT DOCUMENTS

| | | | |
|---|---|---|---|
| 3,271,185 | 9/1966 | Pollock | 524/304 |
| 3,591,409 | 7/1968 | Aubrey et al. | 428/407 |
| 3,632,369 | 12/1969 | Hahn | 428/407 |
| 4,040,996 | 8/1977 | Van Vonno | 427/222 |
| 4,517,246 | 5/1985 | Matsuyama et al. | 428/407 |
| 4,880,470 | 11/1989 | Hyche et al. | 428/407 |
| 4,960,617 | 10/1990 | Chatterjee et al. | 427/222 |
| 4,960,644 | 10/1990 | Hyche et al. | 428/407 |
| 5,141,772 | 8/1992 | Chatterjee | 428/407 |

FOREIGN PATENT DOCUMENTS

| | | | |
|---|---|---|---|
| 0062488 | 10/1982 | European Pat. Off. | 428/407 |
| 0095938 | 8/1981 | Japan | 523/205 |

*Primary Examiner*—Paul R. Michl
*Assistant Examiner*—Peter Szekely
*Attorney, Agent, or Firm*—Otto O. Meyers, III

[57] ABSTRACT

This invention relates to a continuous process for incorporating additives into or onto polymer granules by high speed/high intensity mixing of entrained polymer granules and additive particles, wherein the additive is provided in the form of an additive dispersion.

9 Claims, No Drawings

POST-POLYMERIZATION ADDITIVE INCORPORATION PROCESS

FIELD OF THE INVENTION

This invention relates to an improved process for the provision of additives to polymeric materials. More particularly, the invention relates to a process of contacting polymer granules with an aqueous dispersion of additive or additives whereby the additives are incorporated onto the polymer.

BACKGROUND OF THE INVENTION

The polymerization of lower α-olefins to produce polyolefins is an industry of substantial significance. In a conventional polymerization process, regardless of process type, the polymer product is removed from the polymerization reactor periodically or continuously and is separated from the other product mixture components. The polyolefin is typically recovered as granules whose size and shape depend in part upon the particular catalyst and process used. As a part of converting the initial polymerization product to a marketable commodity, it is usually necessary to provide one or more additives to the polymer product to improve stability or other characteristics which may be determined by the particular end use contemplated for the polymer. The applicable additives include thermo-oxidative stabilizers, ultraviolet light stabilizers, processing stabilizers, acid acceptors and other materials chosen to modify the processability and properties of the polymeric substrate. The provision of such additives to the polymer does present some difficulty on occasion.

One conventional method of incorporating additives such as stabilizers into a polyolefin polymer involves the extrusion step typically employed to produce the polymer in pellet form. Stabilizers are mixed with the polymer feed to the extruder and stabilized compositions are produced by the mixing associated with the extrusion. The resulting stabilized polymer is in the physical form of pellets and much of the commercial polyolefin, particularly polypropylene, is marketed in this form. The extrusion method, although widely practiced, has disadvantages in that the polymer and/or additive may degrade under the conditions of heat and shear encountered in the extrusion. Further, the extrusion process is energy-intensive.

In U.S. Pat. No. 3,591,409 there is disclosed a method of coating resin particles which involves high intensity mechanical mixing of a polymer with additives and a binder. In U.S. Pat. No. 4,517,246 there is claimed a polymeric material which has been coated with additives and a binder through the use of a mechanical mixer. In U.S. Pat. No. 4,960,617, Chatterjee, there is disclosed a method of stabilizing polypropylene after passage from the polymerization reactor. This method involves application of additives dispersed in hot, molten wax. In U.S. Pat. No. 3,271,185 a process is described wherein vaporizable antioxidant is added to a fluidized bed of polymer. In Chatterjee, U.S. Pat. No. 5,141,772 a process is described for applying additives in the form of an additive aqueous dispersion to a fluidized bed of polymer granules. Further, U.S. Pat. No. 4,517,246 discloses the use of a batch-type mixer to produce a polyolefin molding material coated with organic binder and additive such as filler.

It would be advantageous to provide an improved method of applying additives to polymeric materials, as well as the additive-incorporating polymer compositions produced by that process.

SUMMARY OF THE INVENTION

The present invention provides an improved process for the incorporation of additives into or onto polymeric material, such as polymer granules, as well as the compositions thereby produced. More particularly, the invention provides a process for applying an additive in the form of an additive dispersion to polymer granules that have been fed into a high speed/high intensity mixer for uniform, homogeneous incorporation of additive particles onto or into the polymer granules. The process is a relatively low temperature, non-extrusion method which results in a reduction in the time and cost of producing additive-containing polymer compositions.

DESCRIPTION OF THE INVENTION

The improved process of the invention is a low temperature, post-reactor, non-extrusion process of incorporating additives onto or into polymer granules. In the process, the polymer to receive the additive or additives is provided as polymer granules and is contacted with an additive in the form of an additive dispersion.

The process of the invention is advantageously applied to a variety of polymeric materials, particularly thermoplastic polymeric materials. In particular, the polymer to be treated with additives can be any thermoplastic polymer which is a polyolefin homopolymer having 2-18 carbon atoms in the repeat unit or a polyolefin copolymer having at least one comonomer wherein the repeat units have 2-18 carbon atoms. Exemplary of suitable polymers are polypropylene, polybutylene, polyethylene or ethylene-carbon monoxide copolymers. Other usable core polymers within this invention include but are not limited to: chlorosulfonated polyethylene, ethylene-propylene copolymer rubbers, ethylene-propylene-diene terpolymers, butyl, butadiene-styrene, silicone, acrylonitrile rubbers, and the like. Polyvinyl chloride polymers and copolymers, polyethylene and copolymers, polypropylene, polyvinylidene chloride, polystyrene, polyimides, polyamides, polyacetals, acrylonitrile-butadiene-styrene, polycarbonates, chlorinated polyethylene, polymethylmethacrylate, polyaromatic sulfones, and the like may also be usable herein.

The specific size or size range of the polyolefin granules to be coated is not critical provided that the granules are of an entrainable size. Expressed differently, the polymer granules have particle sizes such that they can be entrained by high speed/high intensity mixing to allow homogeneous incorporation of additive or additive particles onto or into the polymer granule. Such particle granules have an average particle size from about 0.4 mm to about 6 mm although granules having an average particle size from about 0.5 mm to about 5 mm are preferred in a preferred embodiment of the invention, the polymer to be utilized is a polymer or copolymer of at least one lower α-olefin of up to 6 carbon atoms inclusive, preferably at least one straight-chain lower α-olefin of up to 4 carbons inclusive, e.g., ethylene, propylene, 1-butene and copolymers thereof.

The additives to be employed in the process of the invention are those additives conventionally employed to improve or modify the processability and properties of the polyolefin polymer. Such additives include acid acceptors such as metallic stearates and hydrotalcites, ultraviolet light stabilizers including hindered amine stabilizers, and antioxidants including hindered phenols exemplified by the broad class of commercial antioxidants containing the 3,5-di-tert-butyl-4-hydroxyphenyl moiety, nucleating agents such as sodium benzoate and hydrolysis-resistant fluorophosphonite processing stabilizers. The preferred additives to be applied according to the process of the invention are antioxidants, particularly hindered phenolic antioxidants, processing stabilizers, nucleating agents and acid acceptors. It is further preferred that such additives are not readily hydrolyzable.

The additive or combination of additives, whose provision to the polymer granules is desired, is dispersed, suspended or even partially dissolved in a liquid dispersion medium, such as water, a hydrocarbon diluent or other non-aqueous diluents. The preferred dispersion medium is water which produces an aqueous additive dispersion. The precise ratio of quantity of additive to the amount of inert diluent is variable but the ratio should be such that the dispersion is fluid and capable of being sprayed onto the particles entrained in a high speed/high intensity mixer. Concentrations of additive from about 3% by weight to about 65% by weight based on total dispersion are suitable. Concentrations of additive from about 20% by weight to about 55% by weight on the same basis are preferred. Concentrations of additive from about 30% to about 50% by weight on total dispersion being more preferred, with concentrations from about 38% to about 50% being most preferred.

According to the invention, polymer granules, at the temperature of application, are introduced into a high speed/high intensity mixing means. The dispersion is then applied as by spraying through a nozzle or similar spraying device which is preferably at the top of the high speed/high intensity mixer means. The size of the spraying device or the openings therein is not material provided that a uniform coating of the dispersion can be applied to the polymer granules while entrained in the high speed/high intensity mixer means. This uniformity of coating is provided by the spraying of the dispersion, as well as by deposition of additive on polymer granule that has been coated with the dispersion and by physical exchange of additive particles in the dispersion with the polymer granules. The high energy impact between the additive particles in the dispersion and the polymer granules facilitates additive incorporation onto or into the granules.

In an alternate embodiment of the invention, the process of the invention comprises introducing the polymer granules at the temperature of application into a high speed, high intensity mixer means such as a Turbulizer, manufactured by Bepex Corporation. The Turbulizer is a high speed continuously fed intensive mixer having a rotor shaft with rows of removable paddles on a horizontal shaft. The polymer granules are fed into the Turbulizer. The additive dispersion is sprayed into the Turbulizer simultaneously with the introduction of the polymer granules or while the polymer granules are mixed and entrained in the Turbulizer. During high-speed, high intensity mixing in the Turbulizer, additive incorporation is achieved by the high energy impacts between the additive particles of the additive dispersion and polymer granules, and the energy imparted to the additive particles and polymer granules by the paddles of the Turbulizer.

The energy input to the polymer in the Turbulizer increases with both rotor speed (RPM) and residence time. The residence time is a function of paddle setting, polymer feed rate and rotor RPM.

The average residence time of the thermoplastic polymer particles and the selected additive in the mixer is less than 5 minutes. Preferably the average residence time is from about 1 second to about 2 minutes with feed particles being entrained in air or another gas and are swept around the outermost portion of the mixing chamber at very high speed. The paddle tips have a velocity of 15 to 150 feet per second, preferably 35 to 105 feet per second and more preferably 50 to 90 feet per second. Rotor shaft RPM may vary depending on the diameter of the chamber. For instance, rotor speeds in an 8 inch diameter Turbulizer mixer ranges typically from 500 RPM to 4000 RPM, with preferred range from 700 RPM to 2600 RPM. The feed particles are entrained in air or another gas and are swept around the outermost portion of the mixing chamber at very high speed. The particles eventually exit the chamber after a short residence time. While in the chamber, a small quantity of material is subjected to a high level of mechanical energy while suspended against the wall of the chamber.

The temperature at which the additive dispersion contacts the entrained polymer granules is not critical provided that neither the polymer nor additive is adversely affected (chemically or physically) by the temperature of the contacting and the polymer granules do not become sufficiently "tacky" or "sticky" so that high speed, high intensity mixing and entrainment of the polymer granules becomes unduly difficult. Depending on the polymer type, suitable mixing temperatures are from about 20° C. to about 260° C. However, it is a characteristic of the process of the present invention that the process is effective at relatively low temperatures, e.g., at or about ambient temperature. The preferred contacting temperatures are from about 15° C. to about 115° C. and the use of such relatively low temperatures provides an economic benefit of reduced energy requirements.

The process of the invention offers distinct advantages over other processes of supplying additives to polymeric materials such as the process operates at relatively low temperatures. Further, when the dispersion medium is water, the water acts as a catalyst deactivator, thereby avoiding the need for separate catalyst deactivation processes and equipment. This provides savings of energy and enables reduced dependence on mechanical equipment. It also provides additive-containing polymer in the form of salable granules rather than pellets and thereby eliminates the need for melting of the polymer at a resin producers plant and thus improves oxidative stability of the polymer. Further, the process is particularly useful for ultra high melt flow polymers, such as ultra high melt flow polypropylene, which are difficult to pelletize with conventional (including underwater) pelletizer.

The invention is further illustrated by the following Illustrative Embodiment which should not be regarded as limiting.

ILLUSTRATIVE EMBODIMENT

The Illustrative Embodiment relates to treating an unstabilized polypropylene with an aqueous dispersion of additives and measuring the nucleating efficacy, thermooxidative stability and the corrosivity of the resulting polypropylene compositions.

Two aqueous dispersions were used containing conventional polymer additives. Dispersion A contained ETHANOX® 330, ETHANOX® 398 and sodium benzoate in a 1:1:1 ratio by weight with a total additive content of 50% by weight in the dispersion. Dispersion B contained a 1:1:3:1 ratio by weight of Ethanox® 330, Ethanox® 398, Millad® 3940 and calcium stearate with a total additive loading of 50% by weight. ETHANOX® 330 (Ethyl Corporation) is a hindered phenolic antioxidant, ETHANOX® 398 (Ethyl Corporation) is a fluorophosphonite processing stabilizer. Calcium stearate is an acid acceptor. Millad® 3940 (Milliken Chemical Company), which is bis(p-methylbenzylidene) sorbitol is a nucleating agent. Sodium benzoate acts as both a nucleating agent and acid acceptor. Each dispersion also contained oxidized polyolefin wax, nonionic surfactant, antifoam, biocide and a base.

Equipment and Procedure

Post-reactor incorporation of additive experiments were conducted using an 8 inch Turbulizer intensive mixer Model TCJS-8, manufactured by Bepex Corporation, Minneapolis, Minn. In the Turbulizer there are four rows of paddles on a single horizontal shaft in two planes at 90° to each other. Each row has ten paddles. The number one, two and three paddles in each row were pitched at about 45° forward so as to propel the contents forward toward the exit of the mixer. The number 9 paddles were all flat and the tenth set had two flat paddles and two with reverse pitch. The remaining five sets of paddles were varied, for example, with two paddles, numbers 4 and 5, in a flat pitch configuration parallel to the axis of rotation with the other three, numbers 6, 7 and 8, in a backward pitch.

The jacket temperature of the Turbulizer was controlled by introducing steam.

The solid polypropylene was metered into the Turbulizer mixer continuously via an Acrison feeder. Each aqueous additive dispersion, at 21° C., was metered using a Masterflex pump and sprayed into the Turbulizer from a location at the top of the Turbulizer (Dispersion A was used in Run Nos. 1–12; Dispersion B in Run Nos. 13–17). The polymer granules and the additive dispersion were continuously fed into the Turbulizer. The polypropylene granules were fed into the Turbulizer at a rate of 1035 lb/hour and the feed rate of the additive dispersion was 6.2 lb/hour for Dispersion A and 12.4 lb/hr for Dispersion B. Additives, fed as an aqueous dispersion, were incorporated into or onto the polypropylene particles via high speed impingement. The aqueous medium is readily removed by evaporation in the Turbulizer. The additive-containing polypropylene resin was discharged continuously at the bottom of the Turbulizer.

The unstabilized polypropylene granules were homopolymer powder having a nominal melt flow of 3 grams per 10 minutes (ASTM D-1238 condition L) and an average particle size of about 0.5 mm.

Thermo-oxidative stability (i.e., oven life) of Turbulizer-processed polypropylene was measured by standard hot air oven aging in the solid state. Before testing, polypropylene from the Turbulizer was compression molded into 60 mil thick plaques (2 inch×2.5 inch). For oven aging the plaques were placed in a forced circulation hot air oven maintained at 150° C. The aging procedure followed the guidelines of ASTM D3012. The samples were inspected each weekday, and failure was indicated by brittleness and powdery disintegration of polypropylene.

The corrosivity of the samples was determined in a standard Shell Oil Company test in which 30 grams of polypropylene resin were melted in a glass cup and a mild steel disk, cooled by 18° C. water, was held 1.3 cm above the polymer surface. The molten polymer was maintained at 260° C. for 30 minutes so that the disk was exposed to vapors from the polypropylene melt. The disk was used with acetone and examined under a light microscope at 30× magnification for corrosion. The ratings of disks in this test range from 1 (no visible corrosion) to 6 (very severe corrosion). A rating of 3 or less is generally considered acceptable. Corrosivity of the samples generally reflects the efficacy of the acid acceptor.

The efficacy of incorporation of the sodium benzoate or Millad 3940 nucleating agent was measured by thermal analysis using a differential scanning calorimeter (Perkin-Elmer 7 Series). Both isothermal crystallization half time (ICHT) and crystallization temperature (Tc) were measured. Compared to the neat (unstabilized) polymer, a lower ICHT or higher Tc indicates nucleating effect. For ICHT measurement the polypropylene resin was melted at 220° C., held 5 minutes, and then cooled to 130° C. at which temperature the polymer crystallized. For Tc measurement the polypropylene was melted at 220° C., and cooled at 10° C./minute. The exothermic peak temperature was the measured Tc. The results are shown in Table I.

TABLE I

| Run[1] No. | Paddle Configuration | Jacket Temp, (°C.) | Rotor Speed, (RPM) | $T_c$[3] (°C.) | ICHT at 130° C. (min) | Oven life at 150° C., (days) | Visual[4] Rating |
|---|---|---|---|---|---|---|---|
| Unst.[2] PP | — | — | — | 109.3 | 19.7 | 2 | 4 |
| 1 | 3 back/2 flat | 21 | 1500 | 114.9 | 9.4 | 2 | 4 |
| 2 | 3 back/2 flat | 21 | 2500 | 123.0 | 1.5 | 21 | 2.9 |
| 3 | 3 back/2 flat | 110 | 1500 | 120.1 | 1.6 | 16 | 2.2 |
| 4 | 3 back/2 flat | 110 | 2500 | 123.4 | 1.4 | 39 | 2.8 |
| 5 | 3 back/2 flat | 150 | 1500 | 115.3 | 15 | 2 | 4.2 |
| 6 | 3 back/2 flat | 150 | 2500 | 114.9 | 9.9 | 2 | 4 |
| 7 | All flat | 21 | 1500 | 118.8 | 2.5 | 11 | 2.5 |
| 8 | All flat | 21 | 2500 | 121.1 | 1.7 | 28 | 2.5 |
| 9 | All flat | 110 | 1500 | 116.4 | 2.9 | 8 | 4 |
| 10 | All flat | 110 | 2500 | 122.1 | 1.1 | 13 | 2.2 |
| 11 | All flat | 150 | 1500 | 117.5 | 1.8 | 10 | 2.9 |
| 12 | All flat | 150 | 2500 | 117.7 | 1.9 | 10 | 2.1 |
| 13 | 3 back/2 flat | 21 | 1500 | 125.8 | 0.77 | 30 | 3 |
| 14 | 3 back/2 flat | 21 | 2500 | 125.7 | 0.75 | 22 | 2.8 |
| 15 | 3 back/2 flat | 110 | 1500 | 125.9 | 0.77 | 24 | 2.8 |
| 16 | 3 back/2 flat | 110 | 2500 | 125.9 | 0.73 | 24 | 2.8 |

TABLE I-continued

| Run[1] No. | Paddle Configuration | Jacket Temp. (°C.) | Rotor Speed (RPM) | $T_c$[3] °C. | ICHT at 130° C., (min) | Oven life at 150° C., (days) | Visual[4] Rating |
|---|---|---|---|---|---|---|---|
| 17 | 3 back/2 flat | 150 | 1500 | 113.9 | 1.9 | 2 | 4 |

[1]Run No. 1-12 were made with Dispersion A and Run No. 13-17 were made with Dispersion B.
[2]Unstabilized polypropylene granules (no additives)
[3]$T_c$ = crystallization temperature
[4]Corrosivity rating using light microscope The stability of the Turbulizer-processed polypropylene was higher than the feed granules, demonstrating the beneficial effect of the intensive mixing even at low residence time.

What is claimed is:

1. In a continuous process for incorporation additives onto thermoplastic polymer granules comprising:
   mixing in a continuous feed high-speed/high intensity mixer having rotor speeds sufficient to homogeneously incorporate additive particles onto the thermoplastic polymer granules, a blend consisting essentially of thermoplastic polymer granules and additive particles, wherein the improvement comprises introducing the additive in the form of an aqueous dispersion to the high-speed/high intensity mixer at an intensity high enough and, at a paddle velocity of 15 to 150 feed per second, at an average residence time sufficient to incorporate said additive particles onto said polymer particles, while said polymer granules and additive particles are entrained in a gaseous medium and are swept around the mixer during mixing.

2. The process according to claim 1, wherein the polymer granules are selected from the group consisting of a polyolefin homopolymer having 2-18 carbon atoms in the repeat unit, and a polyolefin copolymer having at least one comonomer which has repeat units of 2-18 carbon atoms.

3. The process of claim 2 wherein the dispersion is applied to the polymer granules at a temperature from about 15° C. to about 30° C.

4. The process of claim 3 wherein the concentration of additive in the dispersion is from about 3% by weight to about 65% by weight based on total dispersion.

5. The process of claim 4 wherein the average time of the particles in the mixer is less than 5 minutes.

6. The process of claim 1, wherein the additive is antioxidant, ultraviolet light stabilizer, acid acceptor, processing stabilizer, nucleating agent or mixtures thereof.

7. An additive-incorporated polymer granule obtained by the process of claim 1.

8. An additive-incorporated polymer granule obtained by the process of claim 5.

9. An additive-incorporated polymer granule obtained by the process of claim 6.

* * * * *